United States Patent Office 2,941,507
Patented June 21, 1960

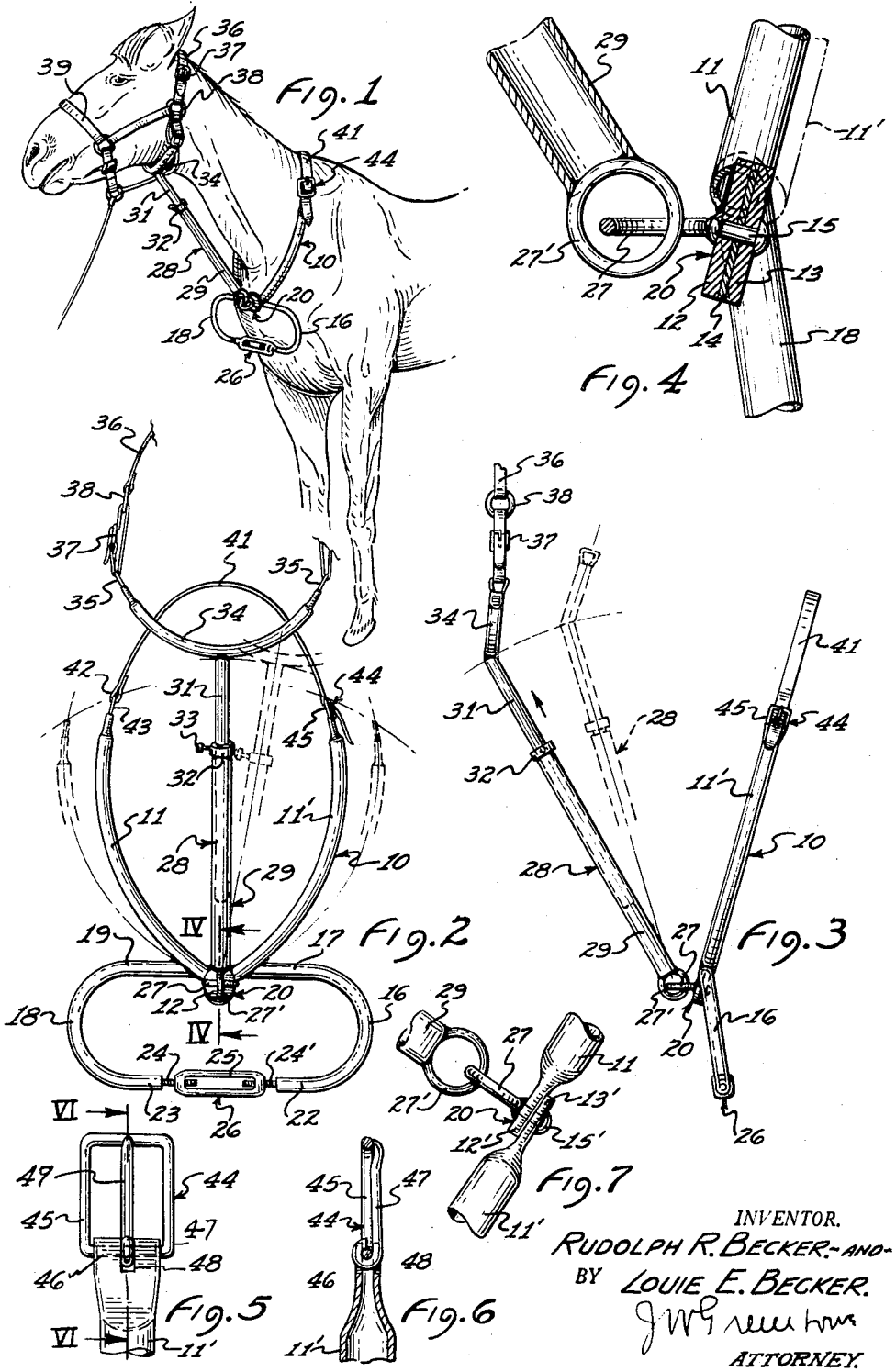

2,941,507

ANIMAL HEAD CONTROL HARNESS

Rudolph R. Becker and Louie E. Becker, both of 6540 N. Black Canyon Highway, Phoenix, Ariz.

Filed Mar. 27, 1959, Ser. No. 802,405

2 Claims. (Cl. 119—96)

The present invention relates to a device for application to an animal to limit the degree of head movement to prevent mouth contact with certain parts of the body under treatment for injury.

It often happens that the foreleg of a horse is injured, as for example, injury to a tendon or joint occurs, requiring medical treatment. During such treatment, the natural instinct of the animal is to lick the injured area, which action not only defeats the end result of the applied medicinal salve or ointment, but may be injurious to the animal when taken internally.

Although it is of great advantage and in many cases essential to control the head movement of a horse when treated for an injury, it is also necessary to allow the animal free movement within a relatively wide range to avoid reactions which normally follow when means are employed to wholly restrict bodily movement of any part of the animal. The present device which may be termed a control harness serves to prevent the head and neck movement necessary to allow mouth contact with parts of the forelegs but permits free movement of the controlled parts to such degree as to relieve the animal of tension, thus avoiding detrimental physical reactions.

An object of the invention is to provide a simple and practical mechanical control harness which may be readily applied to prevent a horse from having mouth contact with parts of the body under medical treatment.

Another object of the invention is to provide a harness so arranged and constructed as to prevent mouth contact of an animal with certain parts of the body while permitting a relatively wide degree of head and neck movement relative to other body parts.

Another object of the invention is to provide a mechanical control harness which may be adjusted to vary the degree of limited movement of the head of an animal to which the harness is applied.

Another object of the invention is to provide a mechanical movement control harness which is adjustable for application to different size horses.

The objects and advantages of the invention will be more clearly understood by reference to the following description together with the accompanying drawing in which:

Fig. 1 is a perspective view of the present control harness as used to limit the degree of head movement of a horse;

Fig. 2 is a front view of parts employed for the harness and indicating in dotted lines certain of the parts in adjusted positions;

Fig. 3 is a side view of the harness shown in Fig. 2 and indicating in dotted lines one of the parts in adjusted position;

Fig. 4 is an enlarged view taken on line IV—IV in Fig. 2;

Fig. 5 is a front view of a buckle employed at the end of a rigid member;

Fig. 6 is a view taken on line VI—VI in Fig. 5, and

Fig. 7 shows a modification of the hinge construction shown in Fig. 4.

As shown in the drawing (see Figs. 2 and 3), the present invention provides a control or retainer harness including a neck yoke or collar 10 consisting of two rigid arcuate members 11 and 11' which may be formed of metal tubing. Each of the arcuate members is so formed as to make comfortable contact with the body of a horse at the neck portion adjacent to the shoulder. One end of member 11 is provided with a metal disk 12 welded thereto (see Fig. 4) and an end of member 11' is provided with a similar disk 13 welded thereto. The disks may have any selected perimeter and, as shown, are circular with a central aperture and are separated by an intermediate washer 14 also having an aperture in alignment with the apertures of the disks. The disks are held in contacting movable relation by means of a pin 15 in the form of a button head type of rivet disposed in the aligned apertures whereby the disks are free to rotate and to provide a hinge 20 connecting members 11 and 11' for relative movement.

Adjacent to the hinged ends of the arcuate members is a U-shape member 16 (see Fig. 2) having one end of an arm 17 thereof secured, as by welding, to arcuate member 11'. Another U-shape member 18 is disposed adjacent to hinge 20 having an arm 19 secured, as by welding, to arcuate member 11 and in the same plane as arm 17. Arms 22 and 23 of U-shape members 16 and 18 respectively are provided with threaded end pieces 24 and 24' having right and left male threads to engage female threads in rotor member or loop 25 to provide a turnbuckle 26. An actuation of the turnbuckle serves to move members 11 and 11' about hinge 20, as for example, to positions as indicated in dotted lines in Fig. 2.

Integral with and extending from pin 15 of yoke 10 (see Fig. 4) is a ring 27 linked to a ring 27' secured to one end of a tubular section 29 of what may be termed an adjustable retainer member 28. The retainer member 28 also includes a slide-rod 31 provided with a slide ring or collar 32 which may be secured to the slide-rod in a selected position along the length thereof by means of set screw 33. Thus the degree of movement of rod 31 into tubular section 29 may be limited. An adjustment of the collar along the rod 31 serves to control the degree of movement and hence controls the downward movement of a bow-shaped member 34 secured to the upper end of the rod 31. The bow-shaped member, when the harness is in use, makes contact with the under surface of the neck adjacent to the head of the animal, hence a downward movement of the head is limited by the collar 32 when secured to the rod 31.

As will be noted, the linked relation of the rings 27 and 27' connects the retainer member 28 to the yoke 10 in such a manner that the linked end of the retainer member, although connected to the yoke in hinged relation, is not limited to the conventional angular movement but allows for variation in the space relation between an end of the retainer member and the yoke. The retainer member which carries the bow member 34 in contact with the head is therefore movable to permit head movement to a greater degree laterally while held from downward movement.

Each end of the bow member is provided with an eyelet 35 through which a strap 36 is threaded and secured by buckles 37. The strap passing about the upper surface of the neck adjacent to the head of the animal serves to hold the bow member in place in contact with the under surface of the neck in close relation to the head. As will be evident, the head is free to move upwardly but is limited in downward movement to a selected distance by means of the collar 32 when secured to rod 31. The strap 36 may be held in fixed relation to the head by being passed through rings 38 of halter 39.

The yoke or collar 10 is also provided with a strap 41 connected at one end 42 to an eyelet 43 at one end of arcuate member 11 and connected by means of buckle 44 to an eyelet 45 integral with an end of arcuate member 11'. Thus the yoke is held in place in contact with the under surface of the neck of the animal.

As shown in Figs. 5 and 6, an end of tubular member 11 is compressed and formed to provide a bearing 46 to engage frame 47, the bearing being formed with a slot 48 to accommodate tongue 49 of the buckle 44.

As illustrated in Fig. 4, metal disks are welded to the ends of the arcuate members 11 and 11' to provide the hinge 20, as shown in Fig. 7. However, ends 12' and 13' of members 11 and 11' respectively may be flattened and connected by pin 15' to avoid the welding operation in the construction of the hinge 20.

From the foregoing, it will be evident that the present invention provides a harness or apparatus that may be readily applied and removed, and although serving to limit the degree of downward movement of the head, permits relatively free movement in other directions.

The two arcuate members 11 and 11', herein termed a yoke, are, as stated, disposed about the shoulders and held in place by strap 41 disposed about the neck adjacent to the withers. The U-shape members 16 and 18 which provide the turnbuckle are positioned adjacent to the breast, or what is termed the point of shoulder, thus the turnbuckle may be adjusted to give the yoke a comfortable fit. With the arrangement shown, the apparatus makes relatively large surface contact with the body to distribute the force which is applied to the bow member 34 upon efforts of the head to move in a downward direction while permitting movement of the head upwardly or in lateral directions.

Although a preferred embodiment of the invention is shown and described herein, it is to be understood that modifications may be made therein without departing from the spirit and scope of the invention as set forth in the appended claims.

What is claimed is:

1. A harness for limiting the degree of head movement of an animal comprising a yoke having a pair of arcuate members, means for hingedly connecting adjacent ends of said members, a pair of U-shape members, an end of one arm of each of said U-shape members secured to an arcuate member, an end of each of the other arms of said U-shape members having a threaded portion, a loop threadedly engaging said threaded portions to provide a turnbuckle operable to change the space relation of said arcuate members, a ring extending from said hinge connection, a tubular member having a ring integral with one end thereof and in linked relation with the ring extending from said hinge, a slide-rod movable in said tubular member, a bow member at one end of said slide-rod, an adjustable collar on said slide-rod for contact with an end of said tubular member for limiting the degree of movement of said bow member in one direction.

2. A harness for limiting the degree of head movement of an animal comprising a yoke having a pair of arcuate members, means for hingedly connecting adjacent ends of said members, a pair of U-shape members, an end of one arm of each of said U-shape members secured to an arcuate member, an end of each of the other arms of said U-shape members having a threaded portion, a loop threadedly engaging said threaded portions to provide a turnbuckle operable to change the space relation of said arcuate members, a ring extending from said hinge connection, a tubular member having a ring integral with one end thereof and in linked relation with the ring extending from said hinge, a slide-rod movable in said tubular member, a bow member at one end of said slide-rod, an adjustable collar on said slide-rod for contact with an end of said tubular member for limiting the degree of movement of said bow member in one direction, and means for adjusting the position of said collar to change the degree of relative movement of said bow member.

References Cited in the file of this patent
UNITED STATES PATENTS

| | | |
|---|---|---|
| 237,893 | Osborn | Feb. 15, 1881 |
| 2,816,525 | Hoagland | Dec. 17, 1957 |